US012637295B2

(12) United States Patent
Lee et al.

(10) Patent No.: US 12,637,295 B2
(45) Date of Patent: May 26, 2026

(54) CONVEYING DEVICE INCLUDING SPIRAL TRACK

(71) Applicant: Energium Co., Ltd., Siheung-si (KR)

(72) Inventors: Kanghee Lee, Siheung-si (KR);
Yongtak Bae, Siheung-si (KR);
Sangjun Park, Siheung-si (KR)

(73) Assignee: ENERGIUM CO., LTD., Gyeonggi-Do (KR)

( * ) Notice: Subject to any disclaimer, the term of this patent is extended or adjusted under 35 U.S.C. 154(b) by 51 days.

(21) Appl. No.: 18/889,709

(22) Filed: Sep. 19, 2024

(65) Prior Publication Data

US 2025/0091813 A1      Mar. 20, 2025

(30) Foreign Application Priority Data

Sep. 19, 2023    (KR) ........................ 10-2023-0124987

(51) Int. Cl.
  *B65G 33/04*          (2006.01)
  *B65G 11/06*          (2006.01)
  *B65G 11/18*          (2006.01)
  *B65G 33/24*          (2006.01)

(52) U.S. Cl.
  CPC ........... *B65G 33/04* (2013.01); *B65G 11/063* (2013.01); *B65G 11/183* (2013.01); *B65G 33/24* (2013.01); *B65G 2201/0235* (2013.01); *B65G 2207/24* (2013.01)

(58) Field of Classification Search
  CPC .................... B65G 33/04; B65G 33/24; B65G 2201/0235; B65G 2207/24; B65G 21/18; B65G 11/063; B65G 11/183; B65G 2812/0505
  See application file for complete search history.

(56) References Cited

U.S. PATENT DOCUMENTS

| | | | | |
|---|---|---|---|---|
| 1,892,206 A | * | 12/1932 | Dietz ................... | B65G 11/203 198/724 |
| 2,145,882 A | * | 2/1939 | Lathrop ................ | B65G 33/04 198/530 |
| 2,628,708 A | * | 2/1953 | Wahl .................... | B65G 11/203 198/724 |
| 3,667,591 A | * | 6/1972 | Sykes .................. | B65G 11/203 198/756 |

(Continued)

OTHER PUBLICATIONS

Extended European Search Report issued in European Patent Application No. 242012730 dated Feb. 13, 2025, 8 pages.

(Continued)

*Primary Examiner* — Mark A Deuble

(74) *Attorney, Agent, or Firm* — Crowell & Moring LLP

(57) ABSTRACT

Disclosed herein a conveying device according to an embodiment of the present disclosure. The conveying device may include a rotation part including a friction layer on a surface thereof, and formed to extend in one direction, and a track part formed to spirally surround an outer circumference of the rotation part and extending along a direction in which the rotation part extends, wherein the rotation part may rotate about a center axis and conveys a conveyed material being conveyed in the conveying device in the one direction using a frictional force of the friction layer, and the track part may support the conveyed material being conveyed in the one direction.

9 Claims, 7 Drawing Sheets

(56)           References Cited

U.S. PATENT DOCUMENTS

| | | | |
|---|---|---|---|
| 3,759,367 A * | 9/1973 | Elliott .................... | B65G 54/02 |
| | | | 198/724 |
| 4,560,086 A * | 12/1985 | Stol ......................... | G07F 11/44 |
| | | | D20/3 |
| 5,297,668 A * | 3/1994 | Zink ...................... | B65G 33/04 |
| | | | 198/860.4 |
| 5,303,814 A * | 4/1994 | Ohtsuji ................. | B65G 33/04 |
| | | | 198/722 |
| 5,765,675 A * | 6/1998 | Draghetti ............... | B65G 47/24 |
| | | | 198/408 |
| 7,913,829 B1 * | 3/2011 | Pratte ................... | B65G 11/183 |
| | | | 193/2 R |
| 2021/0269249 A1 * | 9/2021 | Cho ........................ | A63B 41/08 |

OTHER PUBLICATIONS

Office Action issued in Korean Patent Application No. 10-2023-0124987 dated Apr. 30, 2025, with English translation, 11 pages.

* cited by examiner

CONVEYING DEVICE INCLUDING SPIRAL TRACK

CROSS REFERENCE TO RELATED APPLICATION

The present application claims priority to Korean Patent Application No. 10-2023-0124987, filed Sep. 19, 2023 the entire contents of which is incorporated herein for all purposes by this reference.

BACKGROUND OF THE INVENTION

Field of the Invention

The present disclosure relates to a conveying device including a spiral track.

Description of the Related Art

Test tubes containing samples (e.g., blood) required for various tests are used in medical institutions such as a hospital. To increase the efficiency of a test operation, information on a sample in a test tube may be displayed on a surface of the test tube. For example, the date, time of blood drawing, and personal information on examinee may be displayed on the surface of the test tube by a barcode or the like.

An automated labeling system for test tube may be used that attaches a label with text information or electronic information such as a barcode printed on the surface of the test tube to display information on the sample.

Test tubes that have been labeled by the labeling system or test tubes intended to be supplied to the labeling system may be conveyed using a conveying device. The test tubes may be conveyed along a predetermined direction through the conveying device.

SUMMARY OF THE INVENTION

A test tube needs to be moved in a predetermined direction using a conveying device. For example, a test tube may need to be conveyed substantially in a direction perpendicular to the ground surface in order to be delivered to a predetermined location.

When a test tube is inserted into a conveying device to convey the test tube, it may be difficult to insert the test tube into the conveying device due to the possibility of damaging the test tube by the moving parts of the conveying device.

A conveying device, according to an embodiment of the present disclosure, may include a rotation part including a friction layer on a surface thereof, and formed to extend in one direction, and a track part formed to spirally surround an outer circumference of the rotation part and extending along a direction in which the rotation part extends, in which the rotation part may rotate about a center axis and conveys a conveyed material being conveyed in the conveying device in the one direction using a frictional force of the friction layer, and the track part may support the conveyed material being conveyed in the one direction.

The conveying device according to an embodiment of the present disclosure may include a track part extending spirally to convey a test tube in a direction substantially perpendicular to the ground surface.

The conveying device according to an embodiment of the present disclosure may allow a test tube to be easily inserted into the conveying device without breakage, as the spirally extending track part remains in a fixed state without being rotated.

BRIEF DESCRIPTION OF THE DRAWINGS

In connection with the description of the drawings, the same or similar reference numerals may be used for the same or similar constituent elements.

DETAILED DESCRIPTION OF THE INVENTION

Figure 1:
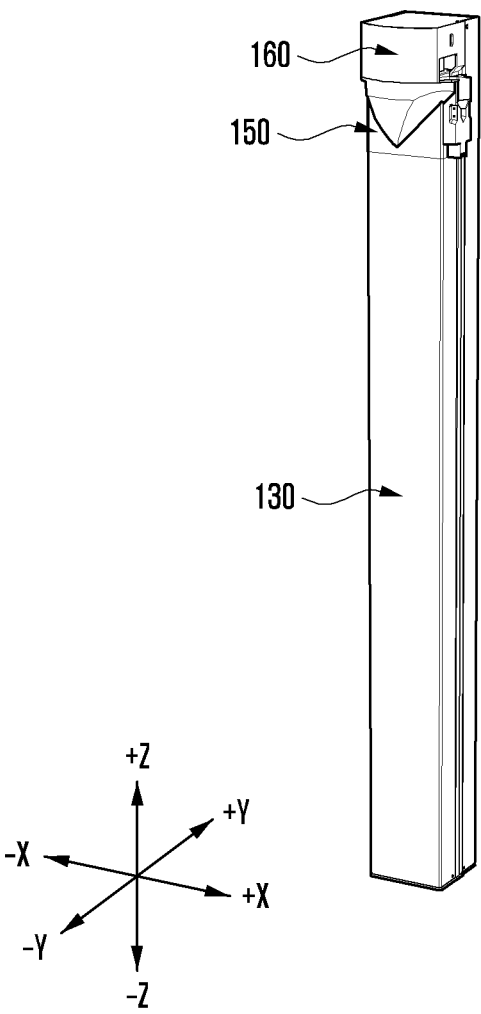
FIG. 1 is a view illustrating a conveying device according to an embodiment of the present disclosure.

Various embodiments of the present document and the terms used in the embodiments are not intended to limit the technical features disclosed in the present document to the particular embodiments and should be understood as including various alterations, equivalents, or alternatives of the corresponding embodiments.

In connection with the description of the drawings, the similar reference numerals may be used for the similar or relevant components. The singular form of a noun corresponding to an item may include one or plurality of the items unless the relevant context clearly indicates otherwise.

In the present document, each of the phrases "A or B," "at least one of A and B," "at least one of A or B," "A, B or C," "at least one of A, B and C," and "at least one of A, B, or C" may include any of the items listed together in the corresponding phrase among those phrases, or any possible combination thereof. Such terms as "1st" and "2nd," or "first" and "second" may be used to simply distinguish a corresponding component from another, and does not limit the components in other aspect (e.g., importance or order).

FIG. 1 is a view illustrating a conveying device 100 according to an embodiment of the present disclosure.

Figure 2:
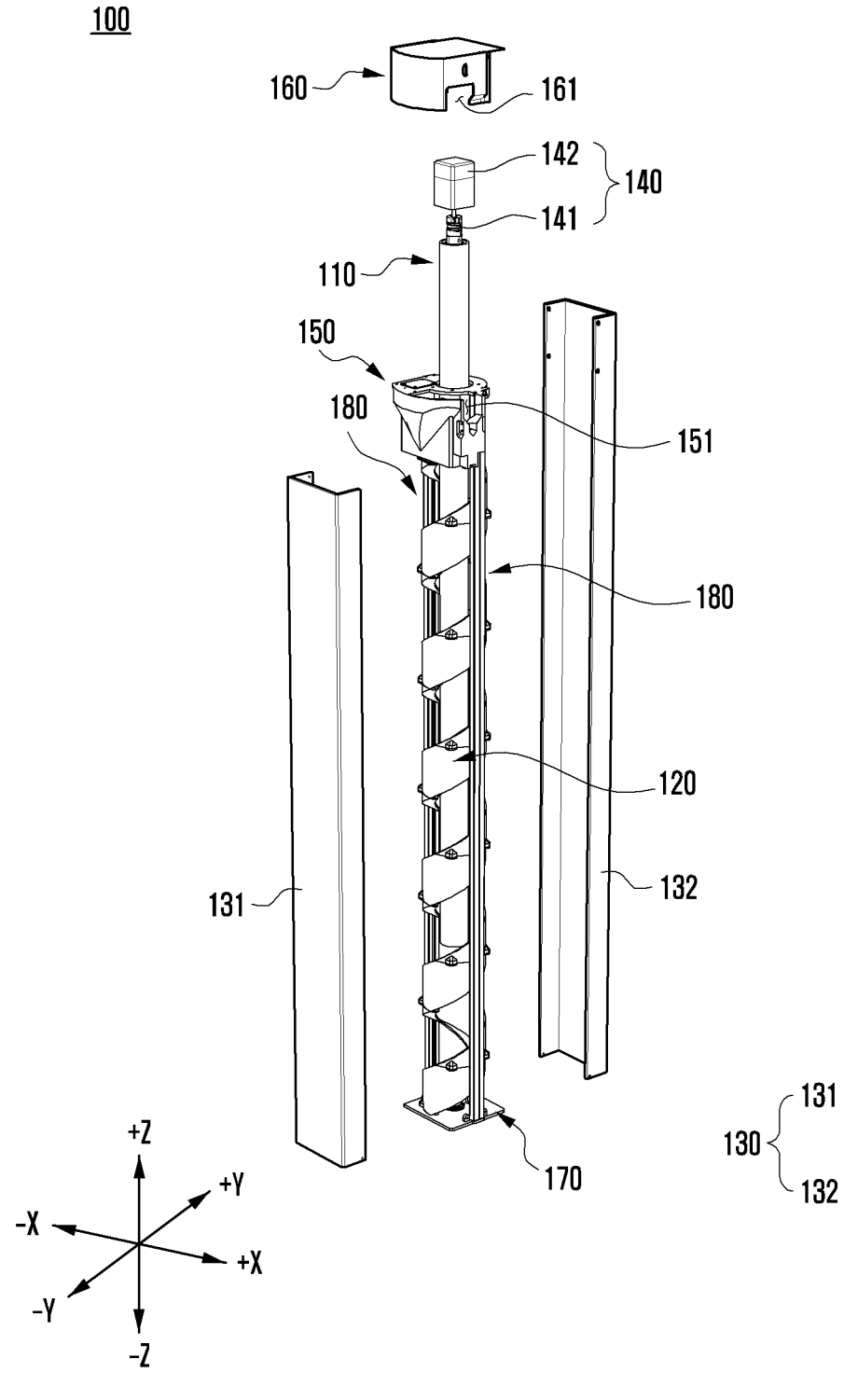
FIG. 2 is an exploded perspective view of a conveying device according to an embodiment of the present disclosure.

FIG. 2 is an exploded perspective view of the conveying device 100 according to an embodiment of the present disclosure.

In describing the conveying device 100 according to an embodiment of the present disclosure, a height direction of the conveying device 100 may refer to a z-axis direction. A width direction of the conveying device 100 may refer to an x-axis direction or a y-axis direction. The width direction of the conveying device 100 may refer to a direction perpendicular to the height direction of the conveying device 100.

With reference to FIGS. 1 and 2, the conveying device 100 may include a rotation part 110, a track part 120, a housing 130, a drive part 140, an insertion part 150, a cover 160, a base plate 170, and/or a support part 180.

In an embodiment, the conveying device 100 may be a device that moves a conveyed material that is inserted into the conveying device in the height direction (e.g., z-axis direction) of the conveying device 100. For example, the conveyed material may be moved in a direction substantially perpendicular to the ground surface using the conveying device 100. The conveyed material inserted into the conveying device 100 may be moved in the height direction of the conveying device 100 through the conveying device 100 and then discharged out of the conveying device 100.

In an embodiment, the rotation part 110 may extend along the height direction (e.g., z-axis direction) of the conveying device 100. For example, the rotation part 110 may be formed in a cylindrical shape extending in the height direction of the conveying device 100.

In an embodiment, the track part 120 may be formed to extend spirally from an outer circumference of the rotation part 110. For example, the track part 120 may extend spirally along the outer circumference of the rotation part 110 and along the height direction (e.g., z-axis direction) of the conveying device 100.

In an embodiment, the track part 120 may serve to support the conveyed material being conveyed in the conveying device 100. For example, the track part 120 may support the conveyed material being conveyed in the conveying device 100 in the height direction of the conveying device 100. The track part 120 may support the conveyed material being conveyed in the conveying device 100 so that the conveyed material does not move away from the rotation part 110.

In an embodiment, the housing 130 may be disposed to surround the rotation part 110 and the track part 120 from the outer circumference thereof.

In an embodiment, the housing 130 may serve to protect the rotation part 110 and the track part 120 from external impact.

In an embodiment, the housing 130 may include the first housing 131 and/or the second housing 132. The first housing 131 and the second housing 132 may be disposed in a position symmetrical to each other with respect to the rotation part 110 and the track part 120.

In an embodiment, the second housing 132 may extend further in the height direction of the conveying device 100 compared to the first housing 131.

In an embodiment, the drive part 140 may be disposed at an end of the rotation part 110. The drive part 140 may include a drive motor 141 and/or a case 142. The rotation part 110 may rotate by receiving a rotational force from the drive motor 141. The case 142 may be disposed to surround an outer circumference of the drive motor 141.

In an embodiment, the case 142 may serve to protect the drive motor 141 from external impact. The case 142 may be disposed on one surface of the insertion part 150 (e.g., a surface of the insertion part 150 facing in a positive z-axis direction).

In an embodiment, the insertion part 150 may be disposed at an end of the rotation part 110 and the track part 120. In an embodiment, the insertion part 150 may include an insertion space 151. The insertion space 151 may be connected to the track part 120. The insertion space 151 may be a space into which the conveyed material is inserted. The conveyed material may be inserted into the insertion space 151 and conveyed in the height direction (e.g., z-axis direction) of the conveying device 100 along the track part 120.

In an embodiment, the insertion part 150 may serve to provide a space into which the conveyed material being conveyed in the conveying device 100 is inserted. The insertion part 150 may serve to fix the positions of the rotation part 110 and the track part 120.

In an embodiment, the cover 160 may be disposed at an end of the conveying device 100. For example, the cover 160 may be disposed at an end of the conveying device 100 that is positioned in a positive z-axis direction. The cover 160 may be disposed in a positive z-axis direction with respect to the insertion part 150.

In an embodiment, the cover 160 may be disposed to at least partially surround an outer circumference of the drive part 140. In an embodiment, the cover 160 may serve to protect the drive part 140 from external impact.

In an embodiment, the cover 160 may include the cover opening 161. The cover opening 161 may be formed at a position corresponding to the insertion space 151 of the insertion part 150. The conveyed material positioned outside the conveying device 100 may be inserted into the conveying device 100 through the cover opening 161.

In an embodiment, the base plate 170 may be disposed at an end of the conveying device 100. For example, the base plate 170 may be disposed at an end of the conveying device 100 that is positioned in a negative z-axis direction.

In an embodiment, the support part 180 may extend in the height direction (e.g., z-axis direction) of the conveying device 100.

In an embodiment, the support part 180 may be disposed on one side and the other side of the rotation part 110, respectively. The support part 180 may be connected to the track part 120 at least in part. The support part 180 may serve to fix a position of the track part 120, or support the track part 120.

In an embodiment, the support part 180 may be connected to the insertion part 150 at one end thereof and to the base plate 170 at the other end thereof.

In an embodiment, the rotation part 110, track part 120, housing 130, and/or support part 180 may be disposed on one surface of the base plate 170. The base plate 170 may serve to support the rotation part 110, the track part 120, the housing 130, and the support part 180.

Figure 3:
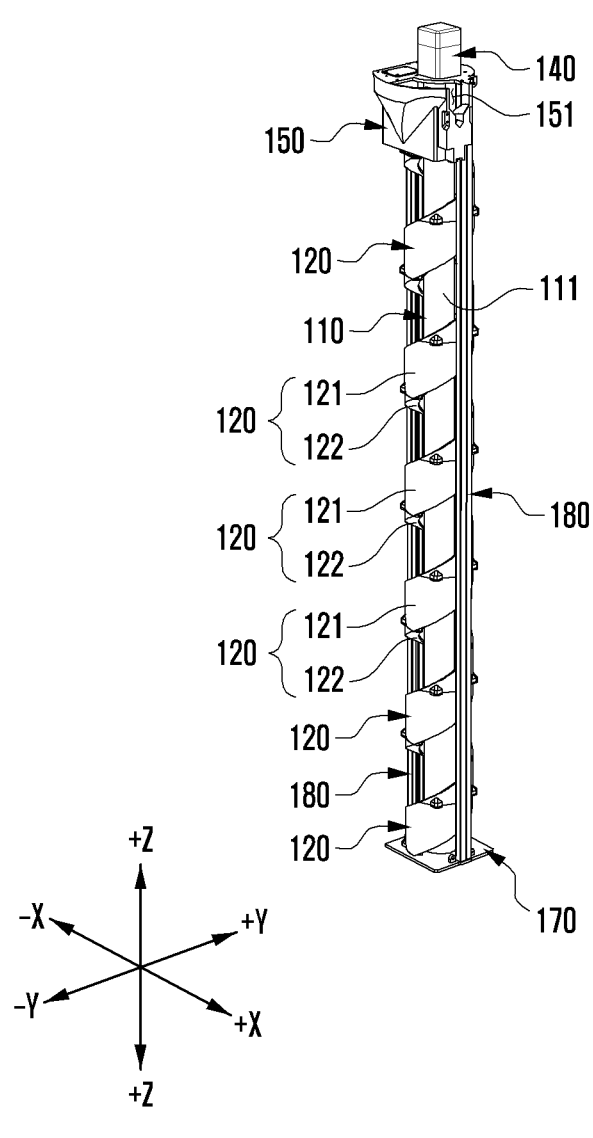
FIG. 3 is a view illustrating a rotation part and a track part, according to an embodiment of the present disclosure.

FIG. 3 is a view illustrating the rotation part 110 and the track part 120, according to an embodiment of the present disclosure.

In an embodiment, the rotation part 110 may extend along the height direction (e.g., z-axis direction) of the conveying device 100. The rotation part 110 may include a cylindrical shape extending in the height direction of the conveying device 100.

In an embodiment, the rotation part 110 may include a friction layer 111. The friction layer 111 of the rotation part 110 may be formed on a surface of the rotation part 110 facing outward.

In an embodiment, the rotation part 110 may include a cylindrical shape. The friction layer 111 of the rotation part 110 may be formed on a surface of the rotation part 110, which has a circumferential surface shape of a cylinder.

In an embodiment, the friction layer 111 of the rotation part 110 may include a frictional material. The friction layer 111 of the rotation part 110 may include a frictional material to transmit a frictional force to a configuration that is in contact with the friction layer 111 of the rotation part 110. For example, the friction layer 111 of the rotation part 110 may serve to transmit a frictional force to the conveyed material being conveyed in the conveying device 100.

In an embodiment, the track part 120 may be formed around an outer circumference of the rotation part 110.

In an embodiment, the track part 120 may include a first support area 121 and/or a second support area 122. In an embodiment, the first support area 121 of the track part 120 may be a surface of the track part 120 formed to face the rotation part 110. The second support area 122 of the track part 120 may be a surface of the track part 120 that is formed substantially perpendicular to the first support area 121 of the track part 120.

In an embodiment, the first support area 121 of the track part 120 may extend spirally. For example, the first support area 121 of the track part 120 may extend in the height direction (e.g., z-axis direction) of the conveying device 100 to surround the outer circumference of the rotation part 110 in a spiral shape. The first support area 121 of the track part 120 may serve to support the conveyed material being conveyed in the conveying device 100 so that the conveyed material does not move away from the rotation part 110.

In an embodiment, the second support area 122 of the track part 120 may serve to support the conveyed material being conveyed in the conveying device 100. For example, the second support area 122 of the track part 120 may support the conveyed material being conveyed in the conveying device 100 in the height direction (e.g., z-axis direction) of the conveying device 100.

In an embodiment, the support part 180 may be disposed on one side and the other side of the track part 120, respectively.

In an embodiment, the support part 180 is connected to the track part 120 and may serve to support the track part 120. For example, the support part 180 may serve to fix a position of the track part 120 while supporting the track part 120 so that the track part 120 remains in a predetermined position.

In an embodiment, one end of the rotation part 110 and the track part 120 may refer to an end of the rotation part 110 and the track part 120 that is positioned in the positive z-axis direction among ends of the rotation part 110 and the track part 120. The other end of the rotation part 110 and the track part 120 is an end of the rotation part 110 and the track part 120 that is positioned in the negative z-axis direction among ends of the rotation part 110 and the track part 120, and may refer to an end of the rotation part 110 and the track part 120 positioned at an opposite side of one end of the rotation part 110 and the track part 120.

In an embodiment, the insertion part 150 may be disposed at one end of the rotation part 110 and the track part 120. The base plate 170 may be disposed at the other end, which is an opposite end of one end of the rotation part 110 and the track part 120.

In an embodiment, the support part 180 may be connected to the insertion part 150 at one end thereof and to the base plate 170 at the other end thereof.

In an embodiment, the conveyed material may be inserted into the insertion space 151 of the insertion part 150. The conveyed material inserted into the insertion space 151 may be moved in the height direction (e.g., z-axis direction) of the conveying device 100 along the track part 120.

In an embodiment, the drive part 140 may be disposed on one surface of the insertion part 150. For example, the drive part 140 may be disposed on a surface of the insertion part 150 facing the positive z-axis direction.

In an embodiment, the drive part 140 may serve to transmit a rotational force to the rotation part 110. The rotation part 110 may rotate by receiving a rotational force from the drive part 140.

Figure 4:
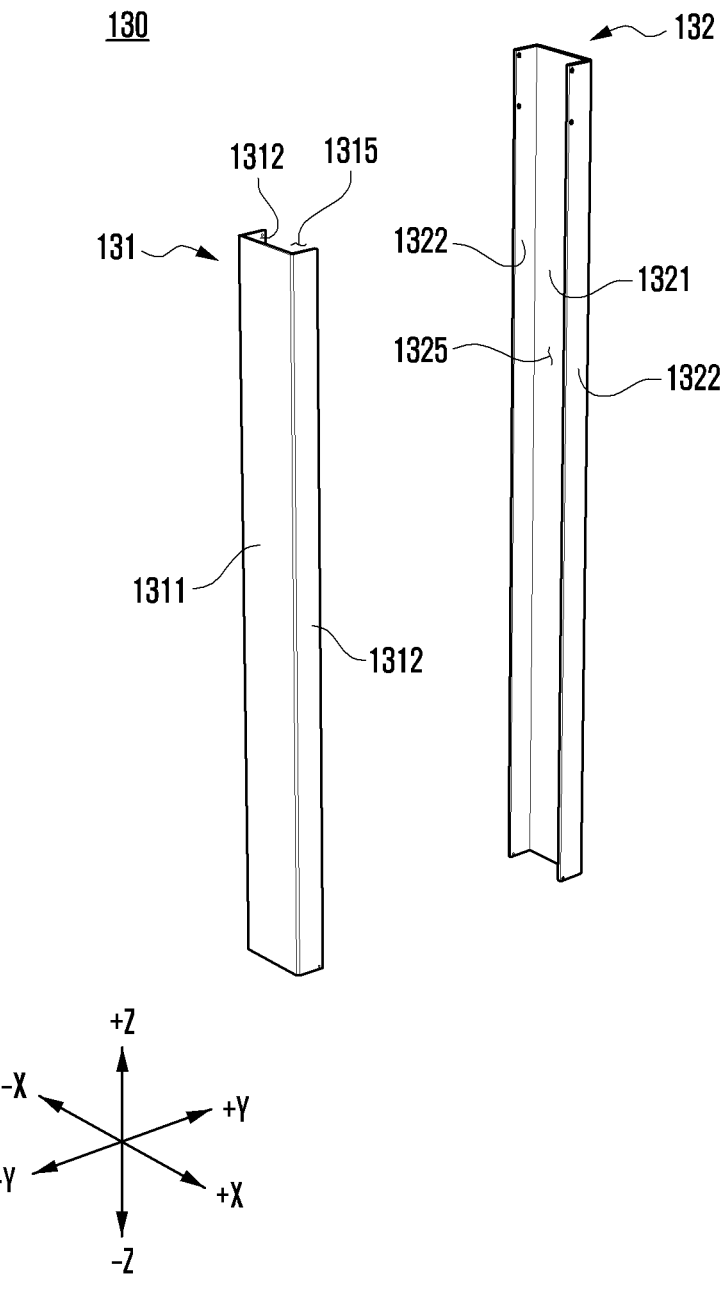
FIG. 4 is a view illustrating a housing according to an embodiment of the present disclosure.

FIG. 4 is a view illustrating the housing 130 according to an embodiment of the present disclosure.

In an embodiment, the housing 130 may include the first housing 131 and/or the second housing 132.

In an embodiment, the housing 130 may include a rectangular cross-section. For example, the first housing 131 and the second housing 132 may include a plate having a rectangular cross-section.

In an embodiment, the first housing 131 may include a first plate area 1311 and/or a first coupling area 1312.

In an embodiment, the first plate area 1311 and the first coupling area 1312 may include a plate shape. For example, the first plate area 1311 and the first coupling area 1312 may be plates that extend with a predetermined thickness.

In an embodiment, the first plate area 1311 and the first coupling area 1312 may be formed to be substantially perpendicular. For example, with reference to FIG. 4, the first plate area 1311 may be formed to have a surface substantially perpendicular to the y-axis direction, and the first coupling area 1312 may be formed to have a surface substantially perpendicular to the x-axis direction.

In an embodiment, the first housing 131 may include two first coupling areas 1312. One first coupling area 1312 may be connected substantially perpendicular to the first plate area 1311 on one side of the first plate area 1311. The other first coupling area 1312 may be connected substantially perpendicular to the first plate area 1311 on the other side of the first plate area 1311.

In an embodiment, the second housing 132 may include a second plate area 1321 and/or a second coupling area 1322.

In an embodiment, the second plate area 1321 and the second coupling area 1322 may include a plate shape. For example, the second plate area 1321 and the second coupling area 1322 may be plates that extend with a predetermined thickness.

In an embodiment, the second plate area 1321 and the second coupling area 1322 may be formed to be substantially perpendicular. For example, with reference to FIG. 4, the second plate area 1321 may be formed to have a surface substantially perpendicular to the y-axis direction, and the second coupling area 1322 may be formed to have a surface substantially perpendicular to the x-axis direction.

In an embodiment, the second housing 132 may include two second coupling areas 1322. One second coupling area 1322 may be connected substantially perpendicular to the second plate area 1321 on one side of the second plate area 1321. The other second coupling area 1322 may be connected substantially perpendicular to the second plate area 1321 on the other side of the second plate area 1321.

In an embodiment, the first housing 131 and the second housing 132 may be coupled to another configuration at the coupling areas 1312 and 1322 so that the positions thereof are fixed in the conveying device 100. For example, the first coupling area 1312 and the second coupling area 1322 may be coupled to the support part 180. Alternatively, the first coupling area 1312 and the second coupling area 1322 may be coupled to each other so that the positions of the first housing 131 and the second housing 132 are fixed.

In an embodiment, the first housing 131 and the second housing 132 may be disposed to at least partially face each other. For example, the first plate area 1311 of the first housing 131 and the second plate area 1321 of the second housing 132 may be disposed to face each other.

In an embodiment, the first housing 131 may form a first installation space 1315. The first installation space 1315 may be a space formed by the first plate area 1311 and the first coupling area 1312. At least a portion of the rotation part 110 and the track part 120 may be disposed in the first installation space 1315.

In an embodiment, the second housing 132 may form a second installation space 1325. The second installation space 1325 may be a space formed by the second plate area 1321 and the second coupling area 1322. At least a portion of the rotation part 110 and the track part 120 may be disposed in the second installation space 1325.

In an embodiment, the second housing 132 may extend further in the height direction (e.g., z-axis direction) of the conveying device 100 compared to the first housing 131. The second housing 132 may be coupled to the insertion part 150 and the upper cover 160 in an area extending further compared to the first housing 131.

In an embodiment, the housing 130 may serve to protect the rotation part 110 and the track part 120 from external impact.

In an embodiment, the housing 130 may serve to fix the rotation part 110 and the track part 120 to maintain their positions.

In an embodiment, the housing 130 may include a transparent material. When the housing 130 includes a transparent material, a position of the conveyed material being moved in the conveying device 100 may be visible from the outside of the conveying device 100.

Figure 5:
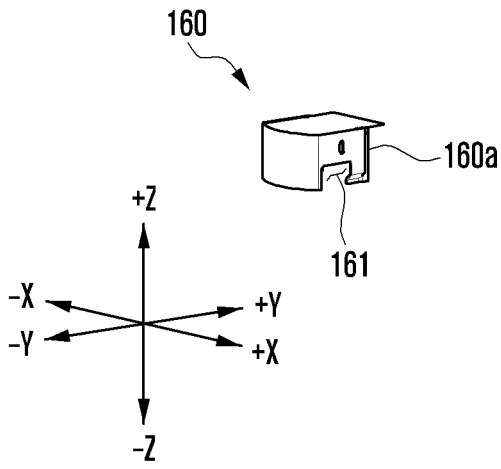
FIG. 5 is a view illustrating a cover according to an embodiment of the present disclosure.

FIG. 5 is a view illustrating the cover 160 according to an embodiment of the present disclosure.

In an embodiment, the cover 160 may be disposed on one surface of the insertion part 150. For example, the cover 160 may be disposed on a surface of the insertion part 150 facing the positive z-axis direction.

In an embodiment, the cover 160 may be disposed to at least partially surround an outer circumference of the drive part 140. In an embodiment, the cover 160 may surround an outer circumference of the drive part 140 and serve to protect the drive part 140 from external impacts. In an embodiment, the cover 160 may include the cover opening 161. The cover opening 161 may be an opening formed at a position corresponding to the insertion space 151 of the insertion part 150.

In an embodiment, the conveyed material positioned outside the conveying device 100 may be inserted into the conveying device 100 through the cover opening 161.

The shape of the cover opening 161 illustrated in FIG. 5 is exemplary for the purpose of description, and the cover opening 161 may have a shape other than the shape illustrated in FIG. 5. For example, the cover opening 161 may be formed to have a circular shape.

In an embodiment, the cover 160 may be coupled to the second housing 132 at least in part. For example, the second housing 132 may be coupled to a side surface 160a of the cover 160. In an embodiment, the second housing 132 and the cover 160 may be coupled and fixed in position within the conveying device 100.

Figure 6:
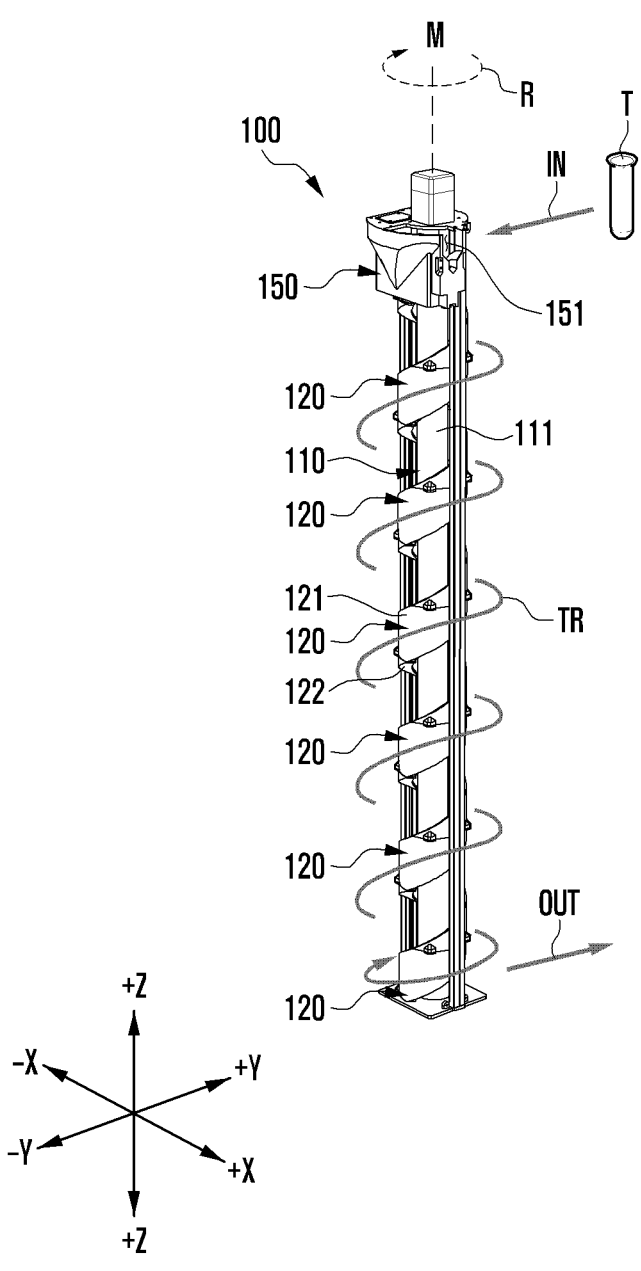
FIG. 6 is a view illustrating movement of a conveyed material in a conveying device, according to an embodiment of the present disclosure.

FIG. 6 is a view illustrating the movement of a conveyed material T in the conveying device 100, according to an embodiment of the present disclosure.

FIG. 6 may be a view illustrating the conveying device 100 in FIG. 1 with the housing 130 and cover 160 omitted.

In an embodiment, the conveyed material T may be inserted into the insertion space 151 of the insertion part 150. For example, with reference to FIG. 6, the conveyed material T may be inserted into the insertion space 151 along an insertion direction IN.

In an embodiment, the conveyed material T inserted into the conveying device 100 may be a test tube containing a sample.

In an embodiment, the insertion space 151 may be connected to the track part 120. The conveyed material T may be conveyed in the height direction (e.g., z-axis direction) of the conveying device 100 along the track part 120 connected to the insertion space 151.

In an embodiment, a portion of the configuration of the conveying device 100 may be rotated, while other portions may not be rotated. For example, the rotation part 110 may rotate in a rotational direction R about a center axis M by receiving a rotational force from the drive part 140. The track part 120, which is disposed on the outer circumference of the rotation part 110, may remain in a fixed state without being rotated.

When the track part 120 is not rotated or remains in a fixed state, it may be difficult for an external conveyed material to be inserted into the conveying device 100. Since the track part 120 of the conveying device 100 according to an embodiment of the present disclosure is not rotated and remains in a fixed state, it may be easy for an external conveyed material to be inserted into the conveying device 100.

In an embodiment, a frictional force may be exerted between the friction layer 111 of the rotation part 110 and the conveyed material T disposed on the friction layer 111. In an embodiment, the rotation part 110 may transmit a frictional force to the conveyed material T that is in contact with the friction layer 111 of the rotation part 110 while rotating. The conveyed material T in contact with the friction layer 111 may receive a frictional force and be moved along a direction in which the rotation part 110 rotates.

In an embodiment, the conveyed material T may be moved along the track part 120. For example, the conveyed material T may be moved along a direction in which the track part 120 extends. Since a frictional force is exerted between the friction layer 111 of the rotation part 110 and the conveyed material T, the rotation part 110 may rotate and exert a force on the conveyed material T. The conveyed material T may receive a force from the rotation part 110, be supported by the track part 120, and be moved along a conveying direction TR illustrated in FIG. 6. In an embodiment, since the track part 120 positioned on the outer circumference of the rotation part 110 is not rotated and remains in a fixed state, the conveyed material T may be moved in the conveying direction TR along the direction in which the track part 120 extends.

In the process of the conveyed material T being moved, the conveyed material T may be supported by the first support area 121 and the second support area 122 of the track part 120. The first support area 121 of the track part 120 may support the conveyed material being conveyed in the conveying device 100 so that the conveyed material does not move away from the rotation part 110. The second support area 122 of the track part 120 may support the conveyed material being conveyed in the conveying device 100 in the height direction (e.g., z-axis direction) of the conveying device 100.

In an embodiment, an upper end of the conveying device 100 may refer to an end of the conveying device 100 that is positioned in the positive z-axis direction. A lower end of the conveying device 100 may refer to an end of the conveying device 100 that is positioned in the negative z-axis direction.

In an embodiment, the conveyed material T inserted in the upper end of the conveying device 100 may be moved along the conveying direction TR to be moved to the lower end of the conveying device 100.

The conveyed material T moved to the lower end of the conveying device 100 may be discharged to the outside of the conveying device 100. For example, the conveyed material T moved to the lower end of the conveying device 100 may be discharged to the outside of the conveying device 100 along a discharging direction OUT.

In FIG. 6, the discharging direction OUT of the conveying device 100 is illustrated as being formed in the positive y-axis direction, but this is exemplary for the purpose of description, and the discharging direction OUT may not be limited thereto. For example, the discharging direction OUT of the conveying device 100 may be formed in the negative y-axis direction or the x-axis direction.

In an embodiment, the housing 130 may include a discharge opening (not illustrated) at least in part for discharging the conveyed material T. The conveyed material T may be discharged to the outside of the conveying device 100 through the discharge opening (not illustrated).

Figure 7:
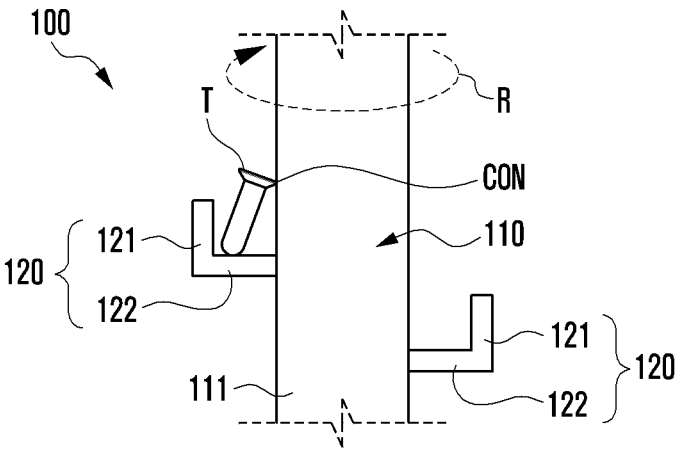
FIG. 7 is a conceptual view illustrating a state in which a conveyed material is conveyed in a conveying device according to an embodiment of the present disclosure.

FIG. 7 is a conceptual view illustrating a state in which the conveyed material T is conveyed in the conveying device 100, according to an embodiment of the present disclosure.

FIG. 7 may be a view illustrating a state in which the conveyed material T is disposed on the track part 120 of the conveying device 100, according to an embodiment. FIG. 7 may be a conceptual view of the conveying device 100 illustrated in FIG. 6, cut into a cross-section substantially perpendicular to the x-axis direction (or y-axis direction).

In an embodiment, the conveyed material T inserted into the conveying device 100 may be disposed on the track part 120. The conveyed material T may be supported by the track part 120 while being conveyed in the conveying device 100. For example, the conveyed material T may be supported by the first support area 121 and the second support area 122 of the track part 120. The first support area 121 of the track part 120 may support the conveyed material being conveyed in the conveying device 100 so that the conveyed material does not move away from the rotation part 110. The second support area 122 of the track part 120 may support the conveyed material being conveyed in the conveying device 100 in the height direction (e.g., z-axis direction) of the conveying device 100.

In an embodiment, the conveyed material T may be in contact with the friction layer 111 of the rotation part 110 at at least one contact point CON. For example, with reference to FIG. 7, the conveyed material T may be in contact with the friction layer 111 at the contact point CON to receive a frictional force. In FIG. 7, the conveyed material T is illustrated as being in contact with the friction layer 111 at one contact point CON, but this is exemplary for the purpose of description, and the conveyed material T may be in contact with the friction layer 111 at a plurality of points.

In an embodiment, the conveyed material T may be disposed on the track part 120 in a state inclined toward the rotation part 110 in the process of being conveyed in the conveying device 100. For example, with reference to FIG. 7, the conveyed material T is disposed on the track part 120 in a state inclined with respect to the height direction of the conveying device 100 and may be in contact with the rotation part 110 at least in part.

In an embodiment, the rotation part 110 rotates in the rotational direction R and may transmit a frictional force to the conveyed material T. The conveyed material T may receive a force (e.g., a frictional force) from the rotation part 110, be supported by the track part 120, and be conveyed along the conveying direction TR illustrated in FIG. 6.

The conveying device 100 according to an embodiment of the present disclosure may include the rotation part 110, which includes a friction layer 111 on a surface thereof and is formed to extend in one direction, and the track part 120, which is formed to spirally surround an outer circumference of the rotation part 110 and extends along the direction in which the rotation part 110 extends.

In an embodiment, the rotation part 110 may rotate about the center axis M and convey the conveyed material T being conveyed in the conveying device 100 in one direction using the frictional force of the friction layer 111, and the track part 120 may support the conveyed material T being conveyed in one direction.

In an embodiment, the conveying device 100 may further include the housing 130 disposed to surround an outer circumference of the rotation part 110 and the track part 120.

In an embodiment, the housing 130 may include the first housing 131 and the second housing 132 coupled to the first housing 131.

In an embodiment, each of the first housing 131 and the second housing 132 may include the plate area 1311 and the coupling area 1322 extending perpendicular to the plate area 1311.

In an embodiment, the conveying device 100 may include the drive part 140, which is disposed at one end of the rotation part 110 and transmits a rotational force to the rotation part 110.

In an embodiment, the conveying device 100 may include the cover 160, which is disposed at one end of the rotation part 110 and is disposed to cover at least a portion of the rotation part 110 and the drive part 140.

In an embodiment, the conveying device 100 may include the support part 180, which is disposed on one side and the other side of the track part 120, respectively, and extends in one direction along the direction in which the rotation part 110 extends and fixes the track part 120.

In an embodiment, the conveyed material T may be a test tube containing a sample. In an embodiment, the conveying device 100 may be a test tube conveying device that conveys a test tube.

In an embodiment, the conveying device 100 may include the base plate 170, which is disposed at an end of the rotation part 110 and an end of the track part 120, and supports the rotation part 110 and the track part 120.

In an embodiment, the conveying device 100 may include the insertion part 150, which includes the insertion space 151 for inserting an external conveyed material T into an interior of the conveying device 100.

In an embodiment, the insertion space 151 may be connected to the track part 120.

In an embodiment, the track part 120 may include the first support area 121 that supports the conveyed material T so that the conveyed material T does not move away from the rotation part 110, and the second support area 122 that supports the conveyed material T in the height direction of the conveying device 100.

The embodiments disclosed in the present specification and illustrated in the drawings are provided as particular examples for easily explaining the technical contents according to the embodiment of the present disclosure and helping understand the embodiment of the present disclosure, but not intended to limit the scope of the embodiment of the present disclosure. Accordingly, the scope of an embodiment of the present disclosure should be interpreted as including all alterations or modifications derived from the technical spirit of the embodiment of the present disclosure in addition to the embodiments disclosed herein.

DESCRIPTION OF REFERENCE NUMERALS

100: Conveying device
110: Rotation part

120: Track part
130: Housing
140: Drive part
150: Insertion part
160: Cover
170: Base plate
180: Support part

What is claimed is:

1. A conveying device comprising:
a rotation part including a friction layer on a surface thereof, and formed to extend in one direction; and
    a track part formed to spirally surround an outer circumference of the rotation part and extending along a direction in which the rotation part extends,
    wherein the rotation part rotates about a center axis and conveys a conveyed material being conveyed in the conveying device in the one direction using a frictional force of the friction layer, and
wherein the track part supports the conveyed material being conveyed in the one direction,
    wherein the track part includes:
    a first support area formed to face the rotation part and configured to support the conveyed material so that the conveyed material does not move away from the rotation part; and
    a second support area formed substantially perpendicular to the first support area and configured to support the conveyed material in the one direction, and
    wherein the conveyed material is in contact with the friction layer at at least one contact point, and is supported in the one direction by the second support area so that the conveyed material is disposed in a state inclined with respect to the one direction.

2. The conveying device of claim 1, further comprising:
a housing disposed to surround an outer circumference of the rotation part and the track part.

3. The conveying device of claim 2, wherein the housing includes a first housing, and a second housing coupled to the first housing, each of the first housing and the second housing including a plate area, and a coupling area extending perpendicular to the plate area.

4. The conveying device of claim 1, further comprising:
a drive part disposed at one end of the rotation part to transmit a rotational force to the rotation part.

5. The conveying device of claim 4, further comprising:
a cover disposed at one end of the rotation part and disposed to cover at least a portion of the rotation part and the drive part.

6. The conveying device of claim 1, further comprising:
a first support part disposed on one side of the track part, extending in one direction along a direction in which the rotation part extends, and fixing the track part; and
a second support part disposed on the other side of the track part, extending in one direction along a direction in which the rotation part extends, and fixing the track part.

7. The conveying device of claim 1, wherein the conveyed material is a test tube containing a sample, the conveying device being a test tube conveying device for conveying a test tube.

8. The conveying device of claim 1, further comprising:
a base plate disposed at an end of the rotation part and an end of the track part, and supporting the rotation part and the track part.

9. The conveying device of claim 1, further comprising:
an insertion part including an insertion space for inserting an external conveyed material into the conveying device, the insertion space being connected to the track part.

\* \* \* \* \*